Patented Dec. 8, 1942

2,304,074

UNITED STATES PATENT OFFICE 2,304,074

DEHYDRATED CASTOR OIL TREATMENT

Oscar A. Cherry, Chicago, Ill., assignor to The Glidden Company, Cleveland, Ohio, a corporation of Ohio No Drawing. Application September 9, 1940, Serial No. 356,033

7 Claims. (Cl. 260—407)

The present invention relates to the improvement of heat bodied dehydrated castor oil.

When dehydrated castor oil is heated to a high temperature to cause bodying, the oil usually suffers an increase in acetyl and acid number. The amount of such increase is dependent to a large extent on both the time and the temperature of the heat treatment, and is also dependent upon the presence or absence of acidic materials.

One of the common processes for dehydrating castor oil to convert it into a drying oil is to heat the castor oil, preferably under reduced pressure, with acidic materials such as sulfuric acid. It is almost impossible to free the dehydrated oil from the small amounts of sulfuric acid used as the catalytic agent.

When such a dehydrated oil containing traces of sulfuric acid is heated to a temperature of from 560 to 600° F. at atmospheric pressure in order to increase the viscosity, there is a rapid increase in the acid value and the acetyl value of the oil. This increase is greater than occurs when dehydrated castor oil containing no mineral acidic material is heated. Quite possibly the increase in acetyl and acid values noted is due to a splitting of the triglyceride present to form mono and diglycerides and free fatty acids. This hypothesis is supported by the known fact that mineral acids and sulfo acids serve as catalytic acids for the hydrolytic splitting of fats by the Twitchell process.

But whether or not the above hypothesis is correct, it is a fact that such a bodied oil, characterized as it is by a high acetyl and acid value cannot be used to make highly water resisting varnishes. Also if such oils are made into varnishes by known methods and such varnishes are incorporated with basic, reactive pigments, the enamels so formed spontaneously increase in viscosity upon aging. Eventually they become so viscous that they cannot be used.

Now I have found that by treating such heat bodied oils, with low boiling alcohols, preferably ethyl alcohol, the acid value and the acetyl value of the oils are substantially reduced. I have further found that heat bodied dehydrated castor oil so treated can be made into highly water resisting varnishes by known methods.

Example I

Castor oil was dehydrated by heating under reduced pressure at 450° F. in the presence of sulfuric acid. The dehydrated oil was then heated at 600° F. in an open varnish kettle for one hour. The acetyl value of the oil was then 25.4 and the acid value was 4.3. To 6 parts by volume of this oil was added 24 parts by volume of anhydrous ethyl alcohol, denatured with ethyl acetate. The mixture was agitated and placed in a separatory funnel. After standing a short time the mixture had formed two layers. The lower oily layer was separated and heated to 500° F. in an open beaker to free it from traces of alcohol. The oil so obtained had an acid value of 1.9 and an acetyl value of 9.9.

The alcoholic layer was distilled to 500° F. (thermometer immersed in the residue). One and one-quarter parts by volume of oily residue was obtained. This oil had an acid value of 10.5 and an acetyl value of 81.8.

Example II 6 parts by volume of heat bodied dehydrated castor oil prepared as in Example I was mixed with 24 parts by volume of denatured alcohol containing approximately 5% of water. The alcohol insoluble layer containing the bulk of the oil was heated to free it from alcohol. It then had an acetyl value of 6 and an acid value of 2.6. The alcohol soluble extract had an acetyl value of 92.2 and an acid value of 15.4. The amount of alcohol soluble extract obtained was ¾ parts by volume.

Example III

Three quarts of heat bodied dehydrated castor oil, the dehydration of which had been accomplished by heating under a vacuum in the presence of sulfuric acid, were mixed with 4-gallons of denatured 95% alcohol and while the mixture was kept agitated it was run into a centrifugal separator of the type adapted to the separation of immiscible liquids of different specific gravities.

The alcoholic layer obtained by this process was distilled to obtain the alcohol soluble extract. This extract had an acid value of 25.6 and an acetyl value of 25.6.

The alcohol insoluble portion was treated again in the same way with 3-gallons of 95% denatured alcohol and the mixture was separated by a centrifuge as above described. The alcoholic solution was evaporated and an alcohol soluble extract having an acetyl value of 97 and an acid value of 18.5 was obtained.

The alcohol insoluble portion obtained was freed from alcohol by heating. It had an acetyl value of 11.8 and an acid value of 2.7.

This oil was made into a 25-gallon long ester gum varnish and after the addition of metallic driers was tested for water resistance. The varnish was flowed onto a tin plate panel, dried for 48 hours and placed in boiling water for one hour. The water resistance was excellent being equal to that obtainable from a similar varnish made from Chinese wood oil. The water resistance of a similar varnish made from the untreated dehydrated castor oil was found to be very poor.

Both anhydrous and 95% alcohol are soluble to some extent in the alcohol insoluble oil. So also is the alcohol soluble portion of the oil soluble in the alcohol insoluble portion of the heat bodied oil.

It is apparent from consideration of the laws of physical chemistry that the heat bodied oil can be the more completely freed from the alcohol soluble portion the larger is the amount of alcohol with which the heat bodied oil is treated. It also follows from the same laws that successive treatments of the heat bodied oil with alcohol will increase the efficiency of the separation of the oil into its alcohol soluble and alcohol insoluble portions.

The smallest ratio of alcohol to heat bodied oil that I have found to be desirable from a practical standpoint is four volumes of alcohol to one volume of oil. It is apparent that the only upper limit is that dictated by considerations of cost and of the capacity of the tanks necessary to handle the oil and alcohol.

It has previously been proposed to treat or extract heat bodied oils such as heat bodied linseed oil with low boiling alcohols. But these processes are based on a different principle than that of the present invention. Linseed oil and other vegetable oils consist of a mixture of glycerides some of which are drying and some of which are non-drying. When the oil is heat treated the drying portions react to form molecules of relatively large size. The non-drying portions remain mono-molecular. Extraction of the heat bodied oils by appropriate solvents removes the mono-molecular compounds and leaves behind the poly-molecular compounds. Among the solvents suitable for this extraction is butyl alcohol. The mono-molecular compounds are soluble in butyl alcohol whereas the poly-molecular compounds are insoluble.

But in the present process a solvent is used which is not a solvent for the mono-molecular oils except the hydroxylated ones. It is well known that ethyl alcohol and particularly 95% ethyl alcohol is not a solvent for triglycerides of the oil fatty acids. It is a solvent for mono-glycerides of oil fatty acids and in the presence of the mono-glyceride is a partial solvent for the diglycerides of oil fatty acids. Therefore, the present process operates to remove from the heat bodied dehydrated castor oil mono-glycerides, diglycerides to some extent and unchanged castor oil. The unpolymerized triglyceride of dehydrated castor oil fatty acids is not removed.

The present process is limited to the use of alcohols of lower molecular weight than butyl alcohol. It is also limited to heat bodied dehydrated castor oil. Treatment of dehydrated castor oil by the present process before heat bodying has no appreciable beneficial effect since the mono and diglycerides removable by the alcohol have not been formed. The process is not limited to dehydrated castor oil formed by the catalytic action of sulfuric or other acidic catalysts since some splitting occurs when any dehydrated castor oil is heat bodied. However, since more splitting occurs when a dehydrated castor oil is heat bodied in the presence of a mineral acid, the beneficial effects of the extraction are greater in that case.

The present invention is not limited to the specific details set forth in the foregoing examples which should be construed as illustrative and not by way of limitation, and in view of the numerous modifications which may be effected therein without departing from the spirit and scope of the invention, it is desired that only such limitations be imposed as are indicated in the appended claims.

I claim:

1. The process of treating a heat bodied dehydrated castor oil having increased acetyl and acid numbers due to bodying, which comprises extracting said heat bodied oil with a low boiling alcohol of lower molecular weight than butyl alcohol.

2. The process of treating a heat bodied dehydrated castor oil heat bodied in the presence of an acidic material which comprises extracting said heat bodied oil with a low boiling alcohol having a lower molecular weight than butyl alcohol.

3. The process of treating a heat bodied sulfuric acid dehydrated castor oil which comprises extracting the heat bodied oil with a low molecular weight alcohol having a lower molecular weight than butyl alcohol.

4. The process of treating a heat bodied dehydrated castor oil which comprises extracting the same with ethyl alcohol.

5. The process of treating a heat bodied dehydrated castor oil which comprises extracting the same with at least four volumes of ethyl alcohol to one volume of oil.

6. The process of treating a heat bodied dehydrated castor oil which comprises extracting the same with 95% ethyl alcohol.

7. The process of treating a heat bodied sulfuric acid dehydrated castor oil which comprises extracting the same with at least four volumes of ethyl alcohol to one volume of oil.

OSCAR A. CHERRY.